2 Sheets—Sheet 1.
C. de FEVER.
DRILLS FOR SOWING AND PLANTING.
No. 177,389. Patented May 16, 1876.
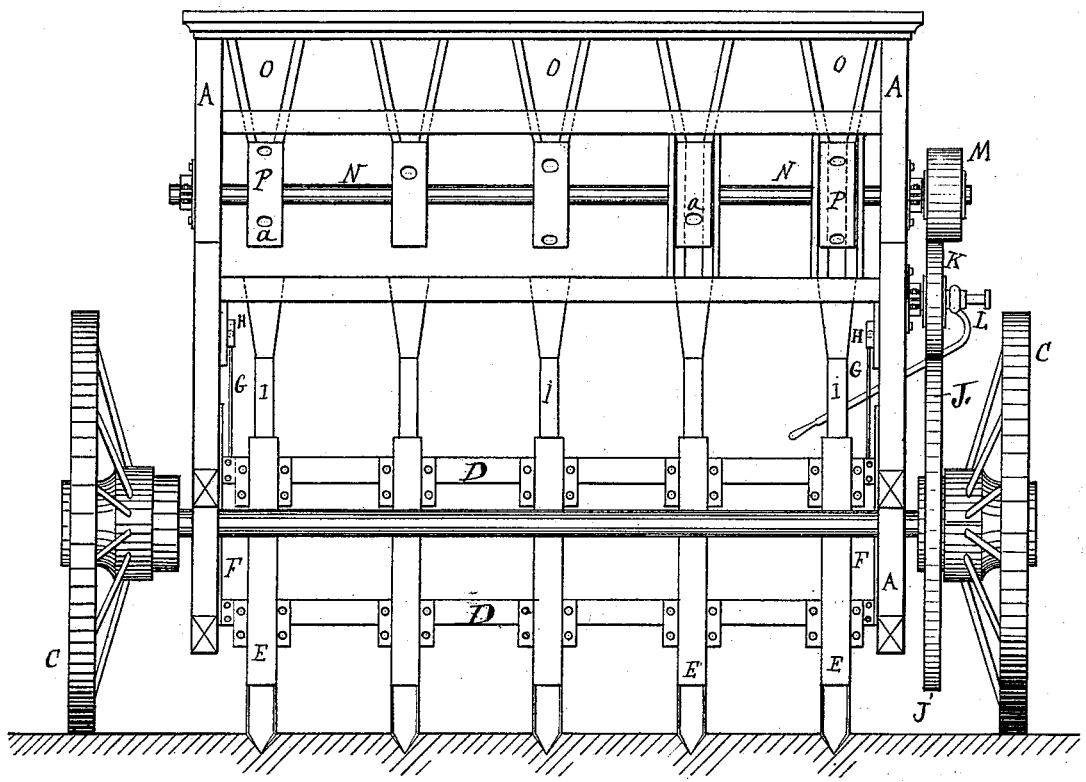
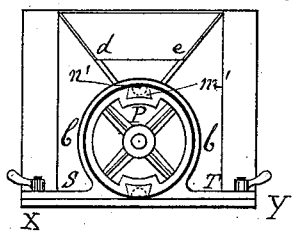

2 Sheets—Sheet 2
C. de FEVER.
DRILLS FOR SOWING AND PLANTING.
No. 177,389. Patented May 16, 1876.
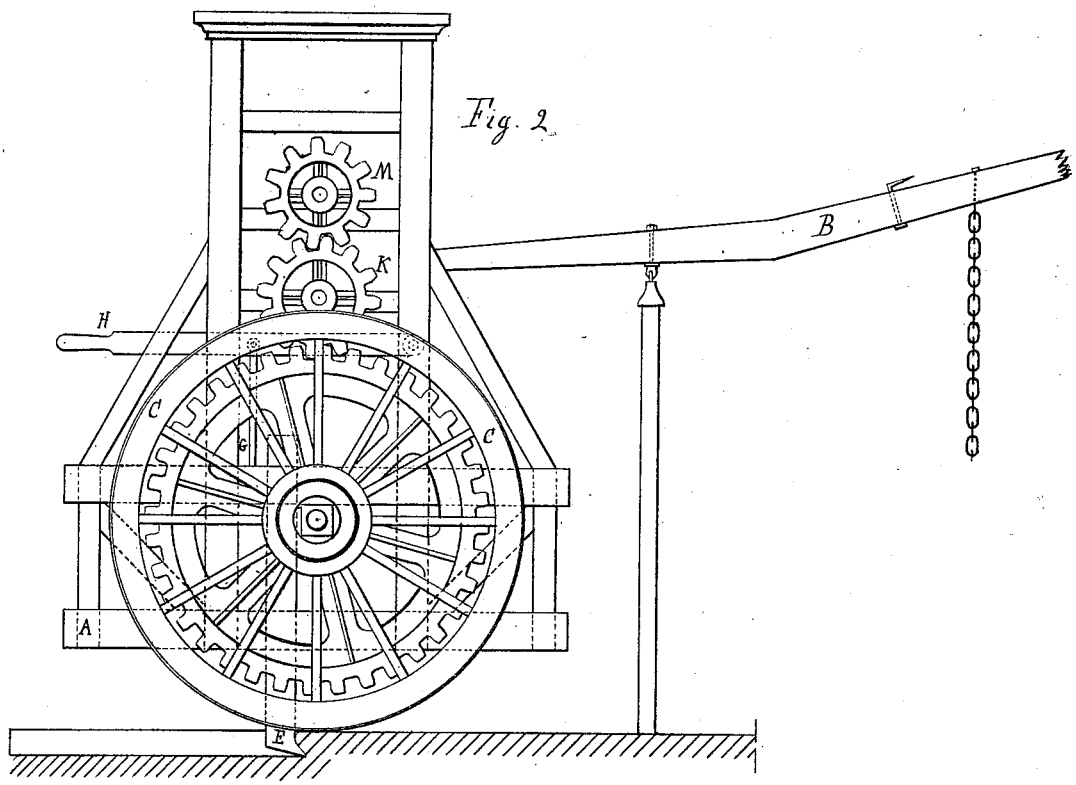
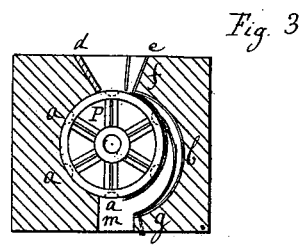
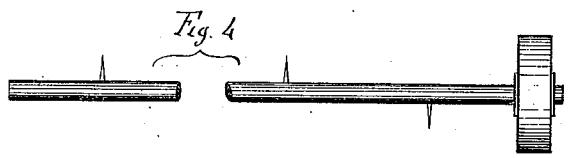

UNITED STATES PATENT OFFICE.

CHARLES DE FEVER, OF PARIS, FRANCE.

IMPROVEMENT IN DRILLS FOR SOWING AND PLANTING.

Specification forming part of Letters Patent No. 177,389, dated May 16, 1876; application filed August 12, 1875.

*To all whom it may concern:*

Be it known that I, CHARLES DE FEVER, of Paris, in the Republic of France, civil engineer, have invented a certain Improved Drill, of which the following is a specification:

This invention consists in the construction of an improved drill for sowing or planting seed, such as cotton, maize, and beans, at any required distance and width apart, and with regularity.

To make my invention better understood I will proceed to describe the same by reference to the accompanying drawing.

On a frame, A, I place an axle carrying two driving-wheels, C. On the nave of one of these wheels is fixed a toothed wheel, J, communicating motion to a pinion, K, provided with an ungearing-lever, L, and thence to a pinion, M, keyed on the shaft N. Two parallel cross-bars, D, sliding at each end from top to bottom, enter two grooves or slides, F, of iron or other suitable material, and support the furrowers E, the number and distances apart of which vary according to the nature of the land and the seed to be planted or sown. The height of the cross bars can be varied by means of the lever H, which supports them through the rod G, which is kept in place by means of a hook or other suitable contrivance. Above the furrowers are placed the tubes I, carrying funnels at the top which receive the seed from the distributing-disks. These distributing-disks are keyed on the shaft N, shown detached at Fig. 5, and are constructed of a pulley-sheave having recesses or receivers $a$ on its circumference, which serve to receive the quantity of seed to be planted at one time and at a given point. I combine the size of the wheels and the pinions with the diameter of the disks in such a manner that the speed at the circumference of the disks shall be the same as that of the driving-wheels C, in order that the seed shall be deposited at distances apart equal to the distance between the receivers $a$ on the disks P. The disks may be so wedged on the shaft N that the receivers may be arranged in such a manner that the seed of one series of disks shall fall in a line perpendicular to the direction of the machine, or so that the planting on one point of a furrow shall be at any required distance in advance or behind that of the following or next furrow. The same furrower may be put in communication with the bottom of two or more disks, so as to deposit or sow various kinds of seeds at one time, either at the same or at different points in the same line. In a similar manner, manure may be distributed at the same time as the seed. The same result is obtained by employing a double hopper supplying the same disk. When seed mixed with down, such as cotton or other like seed is to be planted, its fall is facilitated by means of an auxiliary shaft, Fig. 4, provided with teeth entering the bottom of the hoppers and assisting the fall of the seed. This shaft is driven by the pinion N or otherwise.

The seed from the hopper O falls on the disks P, each of which is placed in a hollow piece of wood, Z, Fig. 3. At $d$ is a small plank of hard wood inclined toward the center of the disk and placed in grooves or channels without rubbing on the disk. $c$ is another piece of wood or sheet-iron, less inclined than the piece $d$, and leaving a play of about one-twelfth of an inch on the disk. At $f$ is a steel blade fixed to the spring $b$, and slightly inclined, so as to shave the seed. The plate $e$ holds the seed in the hopper, so that it shall not be cut by the spring-blade $f$. $b$ is a triple steel spring fixed at $g$. One part of this spring, which is in the form of a spring-blade, rests against the surface of the disk, so that the seed entering the receivers at the upper part cannot fall out before the receivers arrive at $m$. Instead of this arrangement of the disk I can employ the arrangement shown in Fig. 5. P is the disk made of cast iron, in which are placed metal pieces $m'$, cut with a dovetail, and which can be drawn sidewise by sliding them. These pieces, to the number of two, three, or more, are each provided with a recess, $n'$, for receiving the seed, similarly to the recesses $a$, Fig. 3. I can replace the spring by a continuous metallic casing, $b$, perforated at the top for communicating with the hopper $d$ $e$, and at the bottom to allow of the escape of the grain. This casing is provided with a foot or stand, S T, provided with screw-nuts for fixing it on the base-plate X Y.

What I claim is—

In combination with the series of laterally-adjustable hoppers, the series of revolving disks, the series of discharging-tubes I, and the series of furrowers, all laterally adjustable, the furrowers being also free to be simultaneously raised and lowered, as set forth.

In testimony whereof I have hereunto set my hand this twenty-first day of January, one thousand eight hundred and seventy-four.

CHS. DE FEVER.

Witnesses:
CATONNET,
N. DUFRENÉ.